(12) United States Patent
Berger et al.

(10) Patent No.: US 11,047,420 B2
(45) Date of Patent: Jun. 29, 2021

(54) HYDRODYNAMIC BEARING

(71) Applicants: Konzelmann GmbH, Löchgau (DE); Martin Berger, Oberderdingen-Flehingen (DE)

(72) Inventors: Martin Berger, Oberderdingen-Flehingen (DE); Andreas Laage, Bietigheim-Bissingen (DE); Milko Konzelmann, Bietigheim-Bissingen (DE); Thomas Bahret, Bietigheim-Bissingen (DE)

(73) Assignee: Konzelmann GmbH

( * ) Notice: Subject to any disclaimer, the term of this patent is extended or adjusted under 35 U.S.C. 154(b) by 0 days.

(21) Appl. No.: 16/627,544

(22) PCT Filed: Jul. 19, 2017

(86) PCT No.: PCT/EP2017/068276
§ 371 (c)(1),
(2) Date: Dec. 30, 2019

(87) PCT Pub. No.: WO2019/015753
PCT Pub. Date: Jan. 24, 2019

(65) Prior Publication Data
US 2020/0132115 A1    Apr. 30, 2020

(51) Int. Cl.
*F16C 17/04* (2006.01)
*F16C 33/10* (2006.01)

(52) U.S. Cl.
CPC ........ *F16C 17/047* (2013.01); *F16C 33/1075* (2013.01)

(58) Field of Classification Search
CPC ........ F16C 17/04; F16C 17/047; F16C 17/18; F16C 17/22; F16C 33/1075; F16C 33/24; F16C 33/28
See application file for complete search history.

(56) References Cited

U.S. PATENT DOCUMENTS 1,786,565 A    12/1930    Freeman
2,615,766 A * 10/1952    Wallace ................ F16C 17/047
                                                384/420
(Continued)

FOREIGN PATENT DOCUMENTS

DE        1208952 B      1/1966
DE        2165348 A1 * 7/1973        F16C 33/14
(Continued)

OTHER PUBLICATIONS

International search report in corresponding PCT/EP2017/068276 dated Sep. 20, 2017 (not prior art).

*Primary Examiner* — Phillip A Johnson
(74) *Attorney, Agent, or Firm* — Lucian Wayne Beavers; Patterson Intellectual Property Law, PC

(57) ABSTRACT

The invention relates to a hydrodynamic bearing, namely a hydrodynamic disk-shaped thrust bearing or hydrodynamic thrust washer, wherein hydrodynamic structures having elevations and having depressions arranged between adjacent elevations are arranged on opposite sides of the bearing, which hydrodynamic structures extend in the peripheral direction, and slopes of the hydrodynamic structures are arranged between adjacent depressions, which slopes extend from the depressions toward the elevations. According to the invention, at least some of the elevations of the hydrodynamic structures of the first side of the bearing are arranged in the region between two depressions of the hydrodynamic structures of the second side of the bearing, the elevations of a side of the bearing being arranged at an offset to each other in the peripheral direction.

19 Claims, 7 Drawing Sheets

(56) References Cited

U.S. PATENT DOCUMENTS

Figure 1:
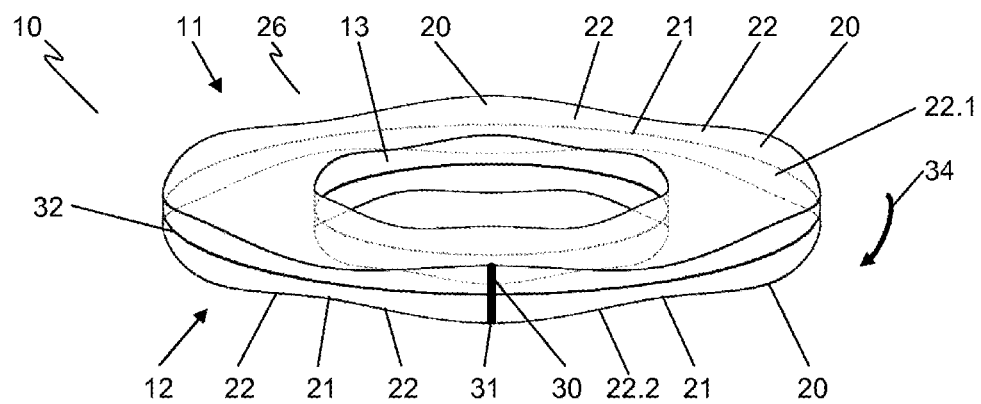

| | | | | |
|---|---|---|---|---|
| 3,413,048 | A | * | 11/1968 | Eudier .................... F16C 17/08 384/303 |
| 4,726,695 | A | * | 2/1988 | Showalter ............... F16C 17/18 384/121 |
| 5,520,466 | A | * | 5/1996 | Everitt ................ F16C 33/1075 384/294 |
| 8,021,105 | B2 | | 9/2011 | Ammann et al. |
| 8,696,192 | B2 | * | 4/2014 | Sprague ................ B01F 5/0463 366/144 |
| 2014/0241887 | A1 | | 8/2014 | Neuenschwander et al. |
| 2018/0023620 | A1 | * | 1/2018 | Berger .................... F01D 25/16 384/107 |

FOREIGN PATENT DOCUMENTS

| | | | | |
|---|---|---|---|---|
| DE | 3901265 | A1 | | 7/1990 |
| DE | 10034123 | C2 | | 3/2003 |
| DE | 102008060370 | A1 | | 6/2010 |
| DE | 102011085681 | A1 | | 5/2013 |
| DE | 102014106925 | A1 * | 11/2015 | ............. F01L 1/053 |
| EP | 38602 | A1 | | 10/1981 |
| EP | 0402333 | A2 * | 12/1990 | ........... F16C 17/047 |
| EP | 2042753 | A1 | | 4/2009 |
| GB | 711075 | A * | 6/1954 | ........... F16C 17/047 |
| JP | 0294917 | U | | 7/1990 |
| JP | 02132121 | U | | 11/1990 |
| JP | 06066150 | A * | 3/1994 | ......... F16C 33/1045 |
| JP | 10002326 | A | | 1/1998 |
| JP | 2004036790 | A | | 2/2004 |
| JP | 2015124727 | A | | 7/2015 |
| WO | 2009107819 | A1 | | 9/2009 |

\* cited by examiner

HYDRODYNAMIC BEARING

The invention relates to a hydrodynamically acting bearing, namely a hydrodynamically acting, disk-shaped axial bearing or hydrodynamic thrust washer, wherein on opposite sides of the bearing are arranged peripherally extending, hydrodynamic structures comprising elevations and depressions arranged between adjacent elevations, wherein between adjacent depressions are arranged slopes of the hydrodynamic structures, which slopes, starting from the depressions, run in the direction of the elevations.

The invention further relates to a hydrodynamically acting bearing, namely a hydrodynamically acting, disk-shaped axial bearing or hydrodynamic thrust washer, wherein the bearing, on the opposite sides, is configured to form hydrodynamic, peripherally extending structures comprising elevations and depressions arranged between adjacent elevations.

A shaft bearing arrangement comprising a slide bearing, in whose bearing bore a shaft is guided with bearing clearance, is known from document DE 100 34 123 C2. On an end face of the slide bearing, a thrust washer is arranged and fastened in a rotationally secure manner on the shaft. In the peripheral direction, the thrust washer is of wavy construction, i.e. with alternating wave peaks and wave troughs. The wave peaks slide on the end face of the slide bearing. The shafts are constructed such that axial shocks are damped and such that hydrodynamic effects are utilized to reduce the sliding friction. The thrust washer here has a uniform thickness, i.e. on the opposite sides of the thrust washer a wave peak and a wave trough always lie opposite one another. The wave peaks are arranged in angular symmetry to the wave troughs. As a result of a specific surface structure of the thrust washer in the wave troughs and flanks, the wave peaks too are purposefully supplied with lubricant.

DE 1 208 952 discloses an axial slide bearing having a ring which forms lubricant wedges interspersed between flat, mutually loaded surfaces. The ring is constructed as a peripherally evenly corrugated, elastic washer of constant thickness, so that respectively a wave peak and a wave trough lie opposite one another on the opposite sides of the washer. The washer forms a floating bearing washer between the two flat thrust surfaces of the bearing. The bearing ensures an equally good lubrication in both rotational directions.

The thrust washer or ring washer shown in documents DE 100 34 123 C2 and DE 1 208 952 act hydrodynamically due to the corrugated surfaces. As a result, in the region of the wedge surfaces formed between the wave troughs and wave peaks is formed, during operation, an increased lubricant pressure. This can rise so strongly that between the washers and the adjoining components, no direct contact, and hence a pure, low-loss liquid friction, can obtain.

The described thrust washer or ring washer deforms under axial load, whereby the wave peaks are moved closer together and hence the wedge angles of the adjoining wedge surfaces become shallower. This leads to an altered, hydrodynamically built-up pressure of the lubricant which is used. The extent to which the wedge angles change depends on the pressure and on the mechanical properties of the respective washer and, in particular, on the material and material thickness thereof, as well on the mutual spacing of the wave peaks in the peripheral direction. The number of waves per washer determines the number of hydrodynamically active surfaces and cannot be changed as desired. An adaptation of the axial deformation of the washer in dependence on the pressure load acting in the respective application can accordingly sensibly be performed only by changing the material thickness of the washer, since an adaptation by way of the material properties is in practice very complicated and only a limited selection of suitable materials having mostly similar material properties is available. With such an adaptation, washers can be designed for different expected loads. Disadvantageously, this leads, under high axial loads, to high material thicknesses and hence to high masses of the washers, which masses have to be moved during operation. In addition, the total thickness of the washers increases, so that they can no longer be used in spatially limited installation situations.

Document DE 39 01 265 A1 shows a hydrodynamic axial slide bearing segment. The axial slide bearing segment bears, distanced by elevations, against a housing wall. Opposite, the axial slide bearing segment has a sliding surface, which is facing toward a sliding partner. In the unloaded state, the distance between the sliding surface and the sliding partner, except for, where applicable, lubrication grooves introduced into the sliding surface, is everywhere equally large. Under load, the axial slide bearing segment between the elevations sags in the direction of the housing wall. This leads in the region of the elevations to bulges on the side of the sliding surface. In this way, in accordance with the number of elevations, circumferentially wedge-shaped gaps are created, which gaps enable a hydrodynamic lubrication. When the load on the slide bearing is altered, the sagging, and hence the lubrication gap geometry, change. The lubrication gap can thereby be adapted to the respective load. Disadvantageously, the hydrodynamically acting sliding surface is formed only in a one direction, so that the axial slide bearing segment can be fitted only in one direction.

It is an object of the invention to provide a hydrodynamically acting bearing (axial bearing or thrust washer) which enables a simple adaptation to the expected axial load on the bearing, and also enables an axial support which exhibits minimum possible losses and minimum possible wear.

For the purpose of the present invention, a thrust washer here differs from an axial bearing in that in an axial bearing the axial forces are calculable and known, since it here comprises a defined structural system. In the case of a thrust washer, the forces acting axially on the thrust washer are not known in detail, since these result from displacements of adjoining components. Such displacements can arise, for example, due to gear tooth defects or elastic deformations of a drive system.

The object of the invention is achieved by virtue of the fact that at least some of the elevations of the hydrodynamic structures of the first side of the bearing are arranged in the region between two depressions of the hydrodynamic structures of the second side of the bearing, wherein the elevations of one side of the bearing are arranged offset from one another in the peripheral direction. There is thus created a bearing which acts hydrodynamically on both sides and which, on each of its sides, can be purposefully adapted to the load which is to be expected there and to the load which acts n total on the bearing. The elevations of one side of the hydrodynamically acting bearing are no longer arranged opposite to the depressions of the second side, whereby a large number of design options for the hydrodynamically active structures is obtained. This enables a high adaptability of the hydrodynamically acting bearing to the anticipated axial forces.

A load bearing capacity of the hydrodynamically acting bearing, which load bearing capacity is distributed evenly over the periphery of the hydrodynamically acting bearing, can be achieved by virtue of the fact that the hydrodynamic structures of at least one side of the bearing are configured such that they repeat periodically.

A simple geometry of the hydrodynamically acting bearing can be achieved by virtue of the fact that elevations of the structures on the first side of the bearing are arranged angularly offset, in the peripheral direction, from depressions of the structures on the opposite second side.

In accordance with a preferred design variant of the invention, it can be provided that elevations of one side of the bearing are arranged at least partially in the peripheral direction angularly offset from the elevations of the opposite side of the bearing. Between adjacent, opposite elevations, a lever is formed in the peripheral direction. In the case of a load which acts axially on the hydrodynamically acting bearing during use, this is elastically deformed due to the leverage. The spacing, measured in the axial direction, of the elevations arranged on the opposite sides of the bearing, and the distance between the elevations and the adjacent depressions of one side of the bearing, is here reduced. Given reduced distance between the elevations and the depressions, also the angle of inclination of the intervening slopes of the hydrodynamically acting structures is reduced. That pressure of the lubricant or oil which builds up on the slopes hence rises. As a result of this pressure increase, the load bearing capacity of the hydrodynamically acting bearing rises. The load bearing capacity of the bearing thus automatically adapts to the obtaining axial load. The extent to which the hydrodynamically acting bearing deforms under load depends on the thickness and the mechanical properties of the material of the bearing, and on the spacing of adjacent elevations in the peripheral direction, and hence the formed lever length. With given material and given material thickness of the hydrodynamically acting bearing, the deformation of the bearing can be specified, in dependence on an expected axial load, by altering the spacing of adjacent elevations in the peripheral direction. Hence the alteration of the load bearing capacity of the bearing can also be constructively specified in dependence on an axial load. This is in particular advantageous, since, in dependence on the environment in which the hydrodynamically acting bearing is used, and on the necessary start-up characteristics, only a limited selection of suitable materials is available, which materials are mostly similar in terms of their mechanical properties. An adaptation of the load bearing capacity of the bearing in dependence on the axial load, by way of appropriately used materials from which the hydrodynamically acting bearing is formed, is thus only limitedly possible. Likewise, a corresponding adaptation by varying the material thickness on the basis of the spatial conditions under which the bearing is set to be used is often only limitedly possible.

Preferably it can be provided that the material thickness of the bearing varies in the peripheral direction and/or in the radial direction. The hydrodynamically acting structures can in this way be configured freely on each side of the bearing and the elevations can be configured offset from one another.

A particularly preferred invention variant is such that in the region of the elevations are configured break contact surfaces, which run preferably in the peripheral direction. When the bearing is stationary or starts up, the adjoining components firstly bear against the break contact surfaces until a sufficiently high hydrodynamic pressure has built up to pass from the initial static friction, via a mixed friction, into the desired liquid friction. In dynamic operation, a pressure builds up along the slopes, which pressure assumes its highest value in the region of the break contact surfaces. As a result of the break contact surfaces, the axial load bearing capacity of the hydrodynamically acting bearing is accordingly increased both in static and in dynamic operation. The break contact surfaces of a respective side of the hydrodynamically acting bearing are preferably arranged in one plane. Advantageously, it can here be provided that the break contact surfaces are oriented plane-parallel to a center plane of the bearing.

Preferably, the break contact surfaces form during the operation of the hydrodynamically acting bearing. During a run-in phase of the hydrodynamically acting bearing, the elevations are here abraded to the point where a continuous liquid friction which prevents further abrasion is formed. The hydrodynamically acting bearing thus automatically optimizes itself to such effect that, at standstill or during start-up of the bearing, with the break contact surfaces there are sufficiently large contact areas present between the bearing and the adjoining components to enable a smooth start-up of the bearing. In addition, the hydrodynamically acting bearing automatically optimizes itself such that, when the operating velocity is reached, such a high hydrostatic pressure builds up that a continuous liquid friction obtains.

In order to avoid a situation in which the lubricant, when the bearing is rotating, flows out of the region of the slopes and consequently at least no sufficient hydrostatic pressure can be built up to obtain a pure liquid friction, it can be provided that the depressions and/or the slopes are bounded radially on the outside and/or inside by retaining edges.

Preferably, it can be provided that the elevations and/or the depressions run from an inner to an outer region of the bearing in a straight line or on curved paths. Rectilinearly running elevations and/or depressions enable a simple wave structure which is angularly offset between the two sides of the hydrodynamically acting bearing. The supply of lubricant can be improved by means of curvedly running elevations and/or depressions.

A simple production of the hydrodynamically acting bearing can be achieved by virtue of the fact that in the peripheral direction the stretch covered by a break contact surface remains the same for all radii of the bearing, or that the break contact surfaces for all radii of the bearing overlay in the peripheral direction the same sector.

An adaptation of the load bearing capacity of the hydrodynamically acting bearing to the anticipated, in particular axial load can therefore be realized by virtue of the fact that the stretch covered in the peripheral direction by a break contact surface, and/or the sector overlaid in the peripheral direction by a break contact surface, enlarges and/or diminishes with increasing distance from the center axis of the bearing.

The adaptation of the load bearing capacity of the hydrodynamically acting bearing can additionally be influenced, and hence adapted to the respective requirements, by virtue of the fact that the distance, measured in the direction of the surface normal of a center plane of the bearing, of the elevations from the center plane remains the same for all radii, and that the distance of the depressions from the center plane alters in dependence on the radius, in particular that, with increasing radius, the distance, measured in the direction of the surface normal of the center plane of the bearing, between a depression and an adjoining elevation diminishes. If, with increasing radius, the distance, measured in the direction of the surface normal of the center plane, between a depression and the adjoining elevation, and hence the depth of the depression, diminishes, then, on the one hand, the incline of the slope arranged between the depression and the elevation can be reduced. As a result, the built-up hydrostatic pressure, and hence the load bearing capacity of the bearing, rise as the radii grow larger. On the other hand, given same inclination of the slope, the length thereof can be shortened, and consequently the hydrodynamic pressure reduced, as the radii grow larger. As a result of the purposeful alteration of the load bearing capacity of the bearing via its radius, a uniform load bearing capacity, independent of the radius, of the hydrodynamically bearing can, for instance, be achieved.

It is conceivable that the hydrodynamic structures is introduced into the bearing by primary shaping or via a material-removing or embossing machining step. By means of primary shaping, the hydrodynamically acting bearing can here be produced in a particularly cost-effective manner, while, by means of material-removing or embossing finishing steps, a very precise and reproducibly producible contour of the hydrodynamically acting structures can be obtained.

Particularly advantageously, it can be provided that the hydrodynamically acting bearing is formed of at least two materials having different thermal expansion coefficients, and that the hydrodynamic structure is formed by different volume expansions of the materials at the respectively prevailing operating temperature. In this way, it can be provided that, at room or ambient temperature, no hydrodynamic structures are formed. Only during operation of the hydrodynamically acting bearing and of the therewith associated temperature increase, do regions of the bearing consisting of a first material expand more strongly than adjacent regions consisting of a second material. The material having the greater thermal expansion coefficient is here, for instance, arranged in the region of the elevations, while the material having the lesser thermal expansion coefficient is present at least in the region of the depressions.

Uniform and stepless transitions between adjacent materials can in particular be achieved also in materials having different thermal expansion coefficients, by virtue of the fact that the at least two materials bear one against the other at boundary surfaces, and that the at least two materials, at the boundary surfaces, are connected to each other at least in some regions by integral bonding and/or force closure. Given a stronger thermal expansion of the one material in relation to the other material, slopes and no stepped transitions are thus formed in the boundary regions between the materials.

A conceivable invention variant is such that the bearing is formed of a polymer material, or that the bearing is formed of a combination of at least a first polymer material with a second polymer material, or that the bearing is formed of a combination of at least a first polymer material with a non-polymer material, in particular a metal, a ceramic or a mineral material. Polymer materials are cheap, easy to work and have a low static friction. In addition, they are chemically resistant and elastically deformable. As a result, hydrodynamically acting bearings which set only a small force against the start of a movement, and which exhibit only small friction losses, even in the region of the mixed friction of the hydrodynamically acting bearing, can be produced economically. Through the combination of two polymer materials, different material properties can be mutually combined. In this way, regions having a greater thermal expansion coefficient or modulus of elasticity can be connected, for instance, to regions having a lesser thermal expansion coefficient or modulus of elasticity. Through the use of metal, ceramic or mineral materials, regions having material properties which strongly differ from one another can be combined. It is consequently possible, for instance, to form mechanically heavily stressed regions by using materials which have a correspondingly higher load bearing capacity or are more resistant to abrasion.

Preferably, it can be provided that the regions of the elevations, in particular the regions of the break contact surfaces, are formed of a material with higher strength, for example metal or ceramic, and the regions of the slopes and/or of the depressions are formed of a material with lower strength, for example a polymer material. When the hydrodynamically acting bearing is started up, the regions of the elevations and of the break contact surfaces are in direct contact with the counter surface and thus exposed to the strongest mechanical load. By virtue of the configuration of the elevations and of the break contact surfaces, the mechanical stress, for example of metal, the mechanical wear in these regions can be kept very low. The slopes and/or the depressions are able to be shaped, for example from a polymer material, very precisely in accordance with the requirements, so that the load bearing strength of the hydrodynamically acting bearing can be exactly specified.

Hydrodynamic structures which have been configured or shaped by means of thermal expansion and which, in comparison to the opposite sides of the hydrodynamically acting bearing, are arranged angularly offset from one another can be acquired by virtue of the fact that the first and the second side of the bearing are respectively formed by a, in the peripheral direction, segmental and periodic succession of at least two materials, and that the periodic succession of the segments of the first side is angularly offset in relation to the second side. When the hydrodynamically acting bearing is warmed to operating temperature, the segments having the higher thermal expansion expand more strongly than the segments having the lower thermal expansion. As a result, the regions of the elevations and depressions are formed. Through the angular offset of the succession of segments between the two sides of the hydrodynamically acting bearing, also the elevations or depressions formed by the thermal expansion are angularly offset from one another.

One possible invention variant is such that, in the region of the depressions and at least in a region of the slopes that adjoins the depressions is arranged at least in some regions a material having a comparatively higher thermal expansion coefficient, and at least in the region of the elevations a material having a comparatively lower thermal expansion coefficient. It can here be provided, for instance, that the hydrodynamically acting structures, at room or ambient temperature, are initially configured such that they are very strong. When the temperature of the hydrodynamically acting bearing rises, the distance, measured in the direction of the surface normal of the center plane of the bearing, between the depressions and the elevations diminishes due to the different thermal expansion coefficients of the materials. A lesser incline, and hence a greater hydrodynamic effect of the slopes, are thereby acquired. This compensates for a reduced load bearing capacity of the, as a result of the temperature increase, lower-viscosity lubricant. In this way, a self-adjusting hydrodynamically acting bearing is thus acquired.

Particularly advantageously, it can be provided that the area of the hydrodynamically active region of the hydrodynamic structures of one side of the hydrodynamically acting bearing accounts for a 30% to 70% share of the total area of the respective side of the hydrodynamically acting bearing, preferably that the share lies within a range of 45-55%, particularly preferredly that the share amounts to 50%. The hydrodynamically active region is here that share of the bearing surface in which an increased lubricant pressure is formed by the relative movement between the bearing and the adjoining component. In particular, with an area utilization factor of 50%, a good load bearing effect of the bearing is obtained. The area utilization factor is here calculated as the share of the load bearing area of the bearing in relation to its total area.

A side-specific adjustment of the load bearing capacity of the hydrodynamically acting bearing can be achieved by virtue of the fact that the area of the hydrodynamically active share of the hydrodynamic structures of one side of the hydrodynamically acting bearing is greater than the area of the hydrodynamically active share of the hydrodynamic structures of the opposite side, in particular that the area of the hydrodynamically active share of the hydrodynamic structures of one side is greater than 50%, and the area of the hydrodynamically active share of the hydrodynamic structures of the opposite side is less than 50%, in relation to the total area of the respective side. The load bearing capacity of the hydrodynamically acting bearing can in this way be specified separately for each side of the bearing. Hence each side of the bearing can be exactly adapted to the requirements as arise from the interaction with the respectively adjoining component.

The object of the invention is also achieved by virtue of the fact that the bearing is formed of at least two materials having different thermal expansion coefficients, such that they are suitable for forming the hydrodynamic structures of at least one side of the bearing, at least in some regions, by different volume expansion of the materials at the respectively prevailing operating temperature. The bearing can be constructed, for instance, such that at room or ambient temperature it is flat on both sides. In this way, it firstly forms a large contact and sliding surface to adjacent structural elements. When temperatures rise, the regions which are produced from a material having a higher thermal expansion coefficient expand more strongly than the adjacent regions, which consist of a material having a lower thermal expansion coefficient. As a result, in the region of the material having the higher thermal expansion coefficient are formed elevations, and in the region of the material having the lower thermal expansion coefficient depressions, which elevations and depressions pass one into the other via slopes. Likewise, it is possible to configure the elevations, depressions and slopes already at room temperature. If then in the region of the depressions is arranged the material having a lower thermal expansion coefficient, and in the region of the elevations the material having a higher thermal expansion coefficient, then with rising temperature the distance between the depressions and the adjacent elevations, which is measured in the direction of the surface normal of the center plane of the hydrodynamically acting bearing, diminishes. As a result, the inclination of the slopes formed between the depressions and the adjacent elevations diminishes. As a result of the reduced inclination, the hydrodynamic effect of the slopes, and hence the pressure of the lubricant that has built up in the region of the slopes, intensifies. This counteracts the reduced viscosity of the lubricant at increased temperatures, which viscosity otherwise leads to a reduction of the hydrodynamically formed pressure.

Figure 2:
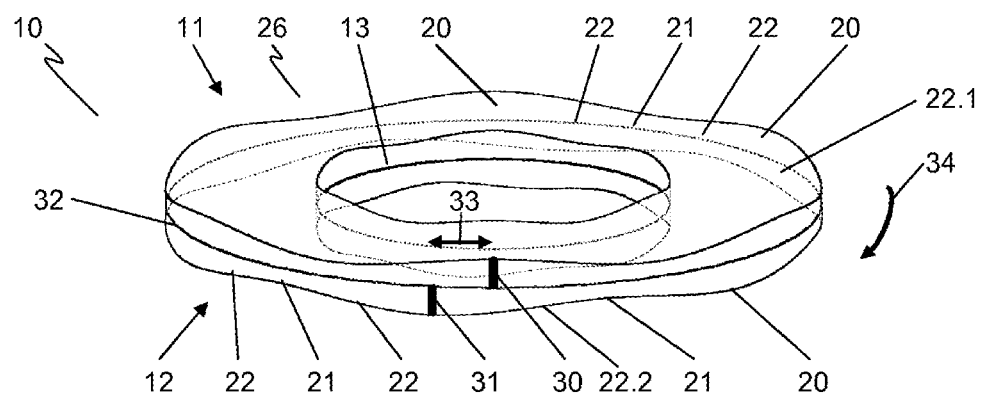
Figure 3:
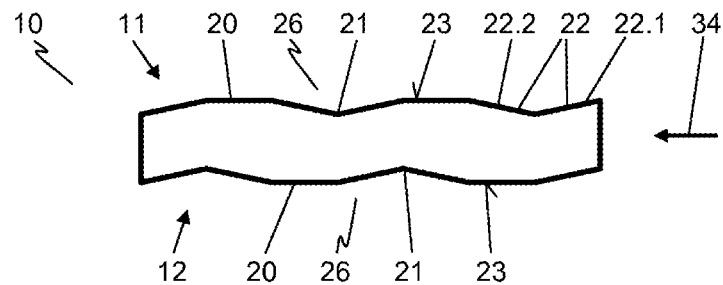
Figure 4:
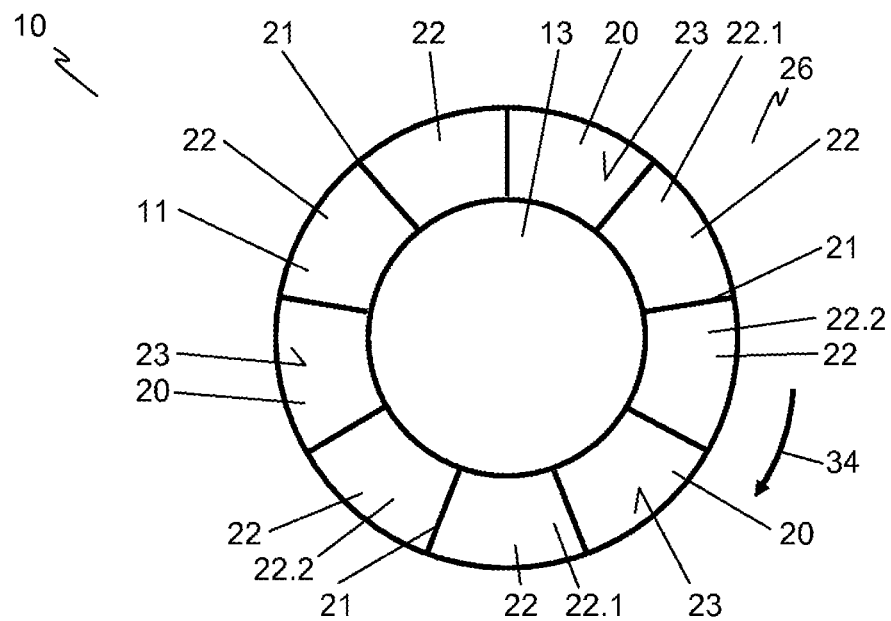
Figure 5:
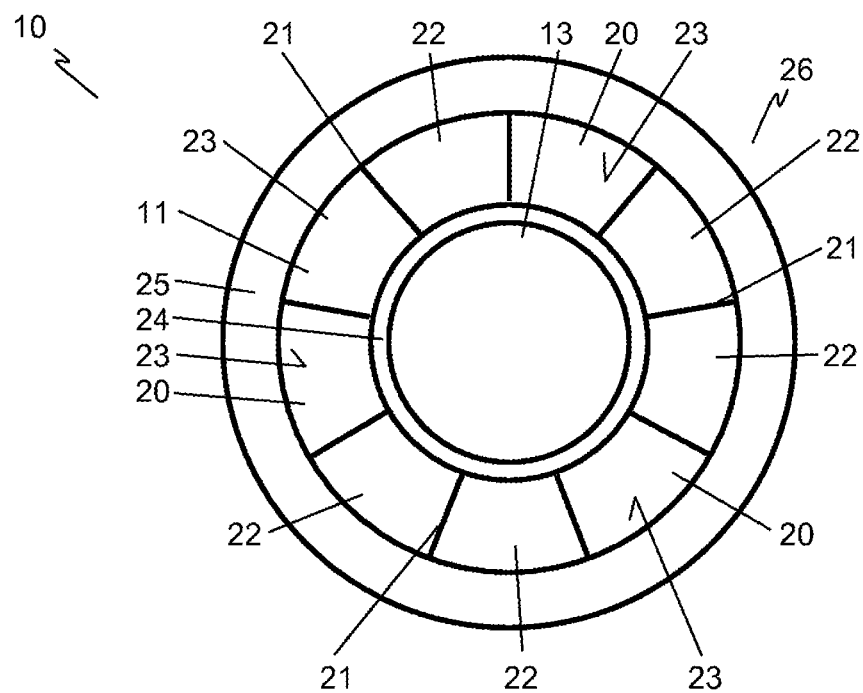
Figure 6:
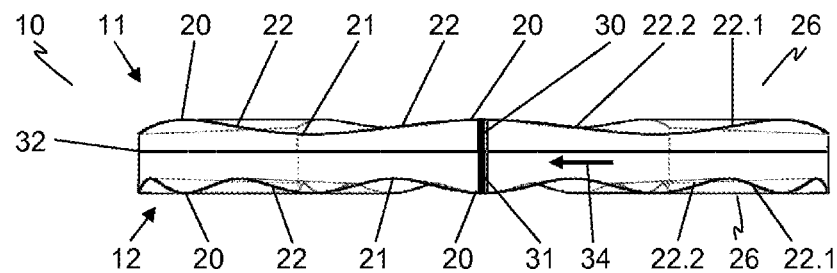
Figure 7:
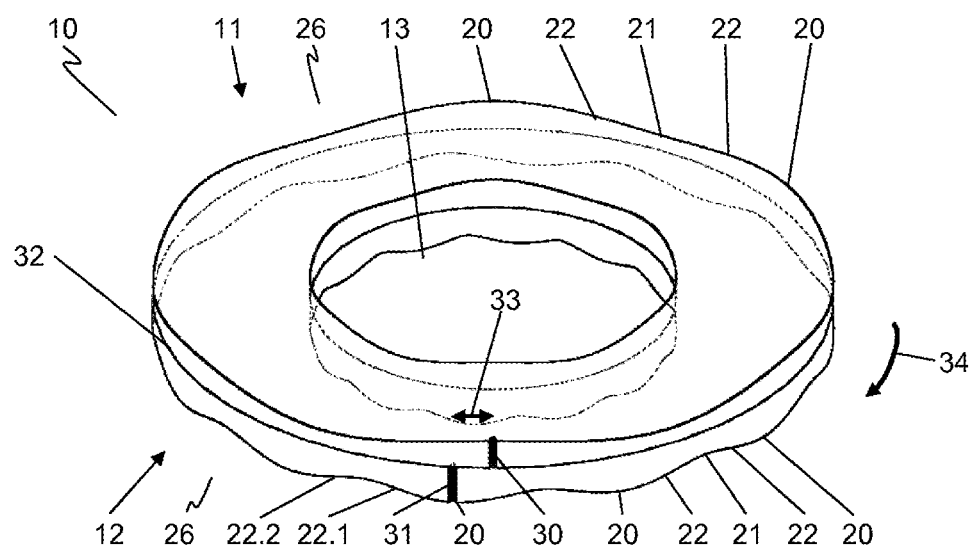
Figure 8:
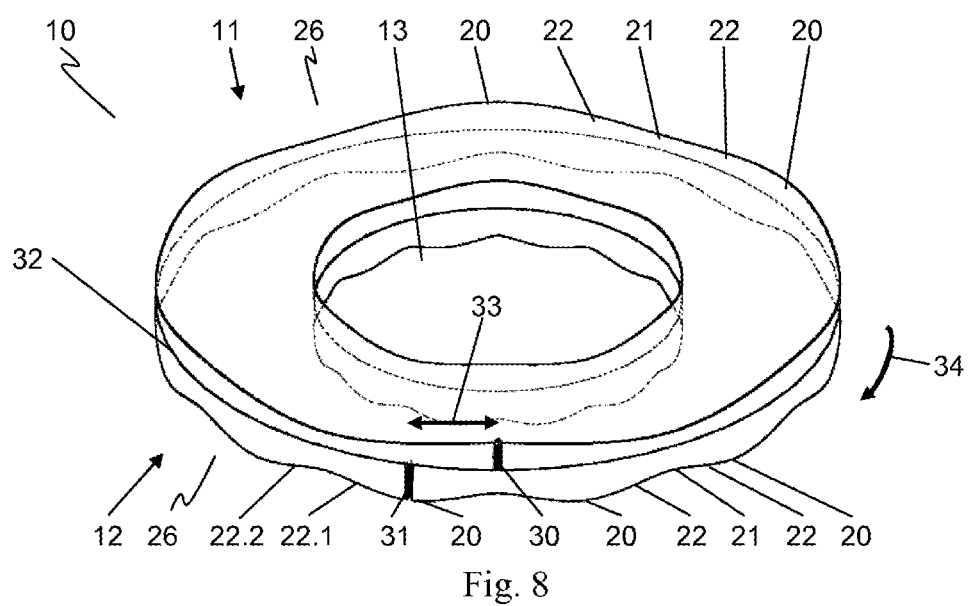
Figure 9:
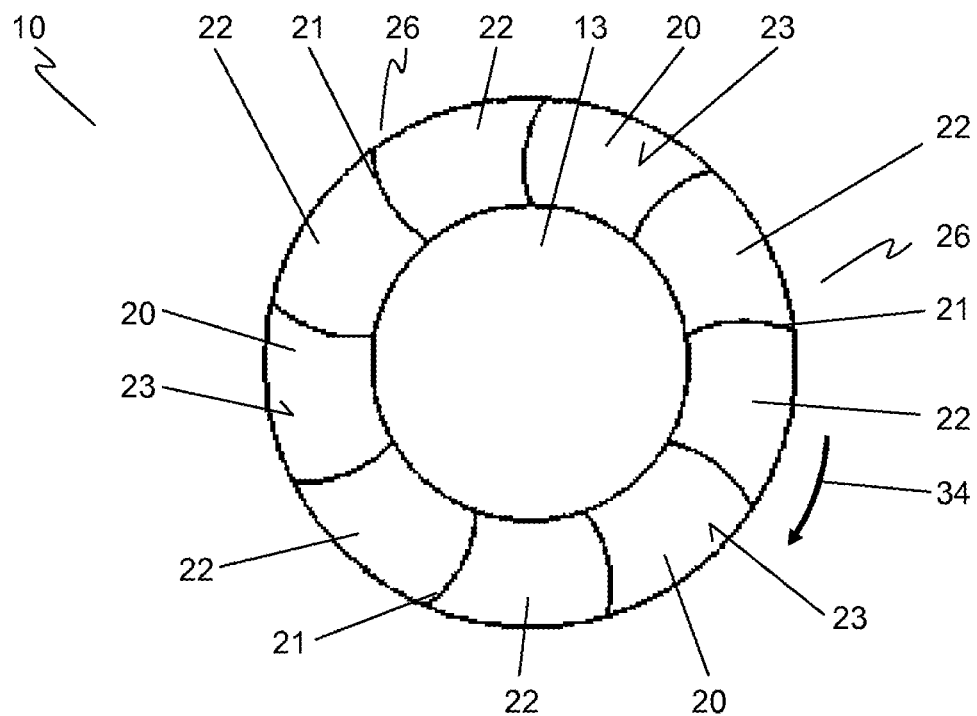
Figure 10:
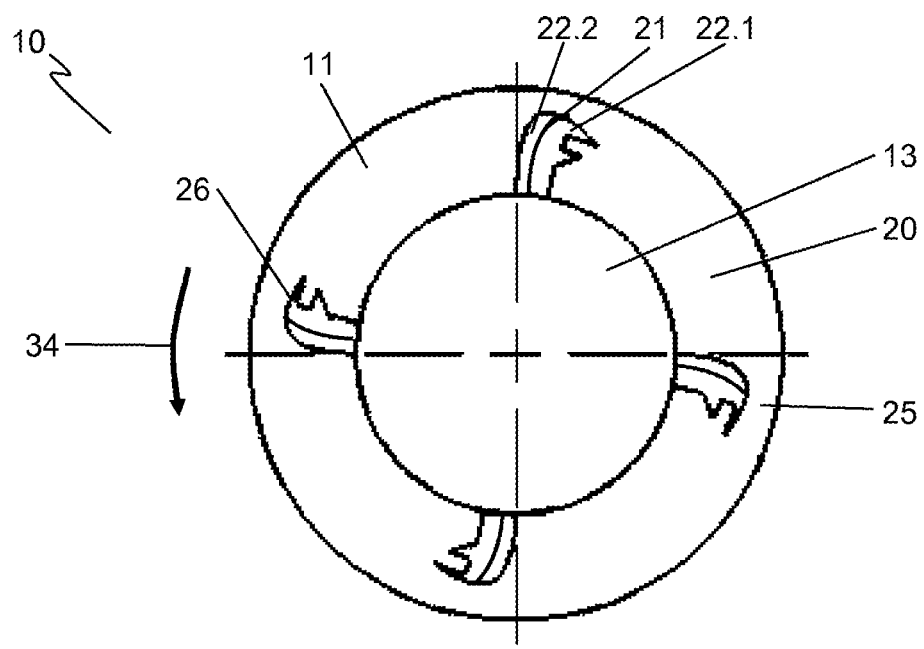
Figure 11:
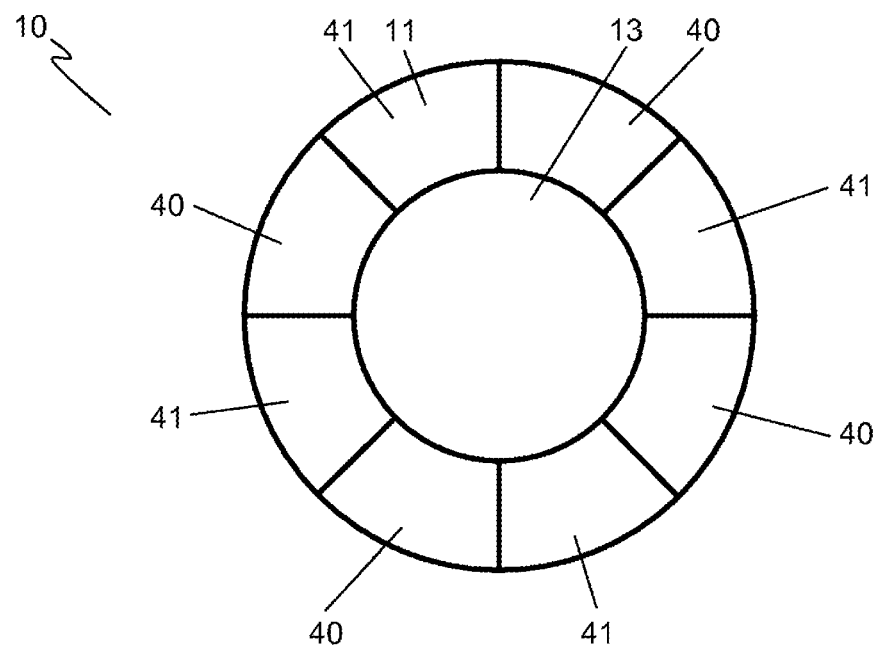
Figure 12:
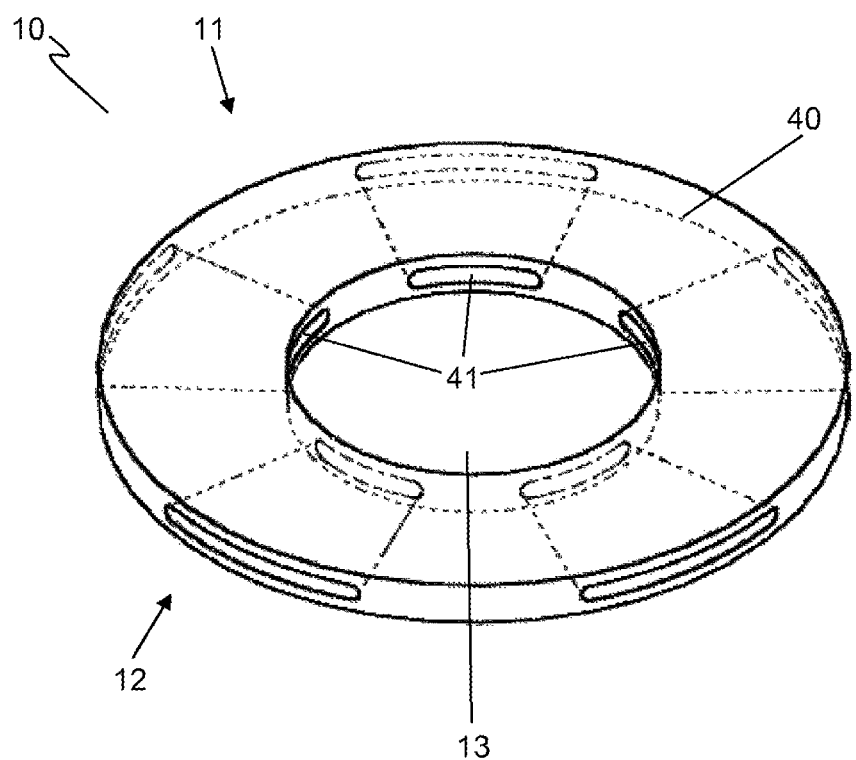
Figure 13:
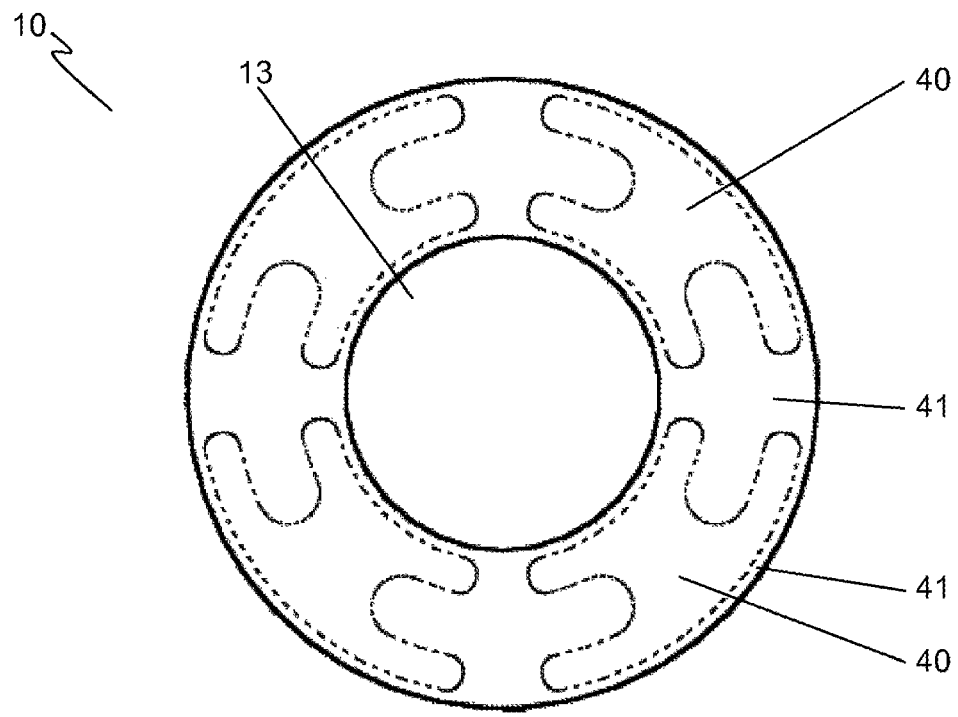
Figure 14:
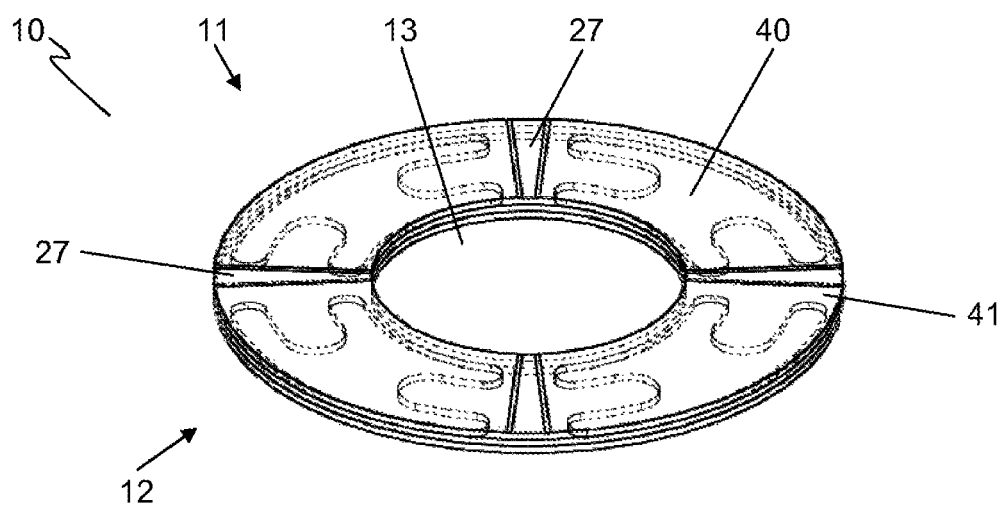
Figure 15:
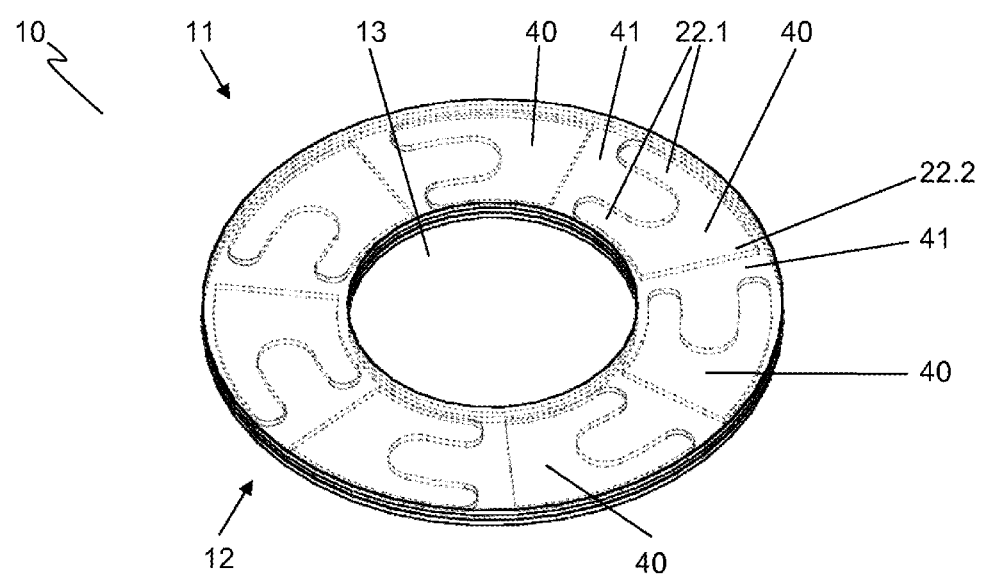
Figure 16:
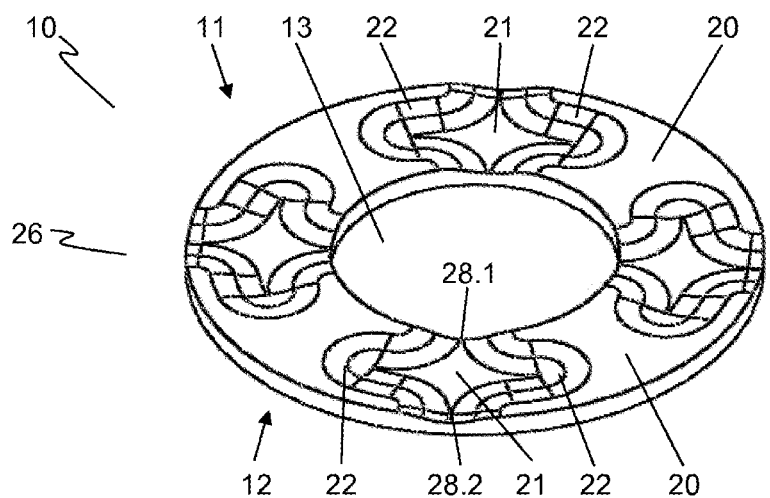

The invention is explained in greater detail below with reference to the illustrative embodiments represented in the drawings, wherein:

FIG. 1 shows in a perspective side view a hydrodynamically acting bearing in the form of a thrust washer having hydrodynamically acting structures arranged on both of its sides, FIG. 2 shows in a perspective side view a hydrodynamically acting bearing in the form of a thrust washer having elevations arranged in offset relationship, FIG. 3 shows in a schematic side view a detail of a hydrodynamically acting bearing in the form of a thrust washer having formed break contact surfaces, FIG. 4 shows the hydrodynamically acting bearing shown in FIG. 3 in a top view, FIG. 5 shows in a top view a hydrodynamically acting bearing in the form of a thrust washer having an inner and an outer retaining edge, FIG. 6 shows in a side view a hydrodynamically acting bearing in the form of a thrust washer having a different number of elevations and depressions on the opposite sides of the bearing, FIG. 7 shows in a perspective side view a hydrodynamically acting bearing in the form of a thrust washer having a different number of elevations and depressions and an offset of the elevations on the opposite sides of the bearing, FIG. 8 shows in a perspective side view a hydrodynamically acting bearing in the form of a thrust washer having a different number of elevations and depressions and a maximal offset of the elevations on the opposite sides of the bearing, FIG. 9 shows in a top view a hydrodynamically acting bearing in the form of a thrust washer having curvedly running depressions, FIG. 10 shows in a top view a hydrodynamically acting bearing in the form of a thrust washer having hydrodynamic structures which vary in terms of their contour, FIG. 11 shows in a top view a hydrodynamically acting bearing in the form of a thrust washer having segments produced from different materials, FIG. 12 shows in a perspective side view a hydrodynamically acting bearing in the form of a thrust washer having material inlays made of a different material, FIG. 13 shows in a perspective side view a hydrodynamically acting bearing in the form of a thrust washer having material inlays made of a different material in a further embodiment, FIG. 14 shows the hydrodynamically acting bearing shown in FIG. 13, having additional lubricant grooves, FIG. 15 shows in a perspective side view a hydrodynamically acting bearing, designed for one rotational direction, in the form of a thrust washer, and FIG. 16 shows in a perspective side view a hydrodynamically acting bearing in the form of a thrust washer having a three-dimensional embossment.

FIG. 1 shows in a perspective side view a hydrodynamically acting bearing 10 in the form of a thrust washer having hydrodynamically acting structures 26 arranged on both its sides 11, 12. The hydrodynamically acting structures 26 are in the present case formed by successions of elevations 20 and depressions 21 arranged periodically in the peripheral direction of the hydrodynamically acting bearing 10. formed between the elevations 20 and depressions 21 are slopes 22, which connect these. As is shown by a first marking 30 and a second marking 31, the elevations 20 of the first side 11 of the hydrodynamically acting bearing 10 are arranged exactly opposite to the elevations of the second side of the bearing 10. Correspondingly, also the depressions 21 and the slopes 22 of the two sides 11, 12 are respectively arranged opposite one another. A center plane 32 of the bearing 10 is marked. For the reception of an axle or shaft, the hydrodynamically acting bearing 10 has a centric feed-through 13.

The hydrodynamically acting bearing 10 shown in FIG. 1 is thus constructed symmetrically in relation to its center plane 32. The hydrodynamically acting structures 26 are configured equally in both peripheral directions and are hence active independently of the direction. Correspondingly, the hydrodynamically acting bearing 10 advantageously does not have to be mounted in a positionally oriented manner.

In the present case, the bearing 10 is produced from a polymer material by means of primary shaping. It is also conceivable, however, to incorporate hydrodynamically acting structures 26 by means of embossing or material removal. The depth of the depressions 21 in relation to the elevations 20 lies within a range of 5-20 µm. The incline of the slopes 22 is about 1 µm/mm.

In order to explain the function of the hydrodynamically acting bearing 10, one possible direction of movement 34 is marked by an arrow. Due to the symmetry of the bearing 10, this can also be used such that the direction of movement 34 points in the opposite direction. The direction of movement marks the relative movement, in the present case of the first side 11 of the bearing 10, in relation to a component adjoining the first side 11. Actually, both the bearing 10 can move in accordance with the shown direction of movement 34, and the adjoining component in the opposite direction. The slopes 22 inclined in the direction of movement 34 constitute ascending slopes 22.1, while the slopes 22 inclined counter to the direction of movement 34 form descending slopes 22.2. The ascending slopes 22.1 and the descending slopes 22.2 are here in the present case of like embodiment and change their functions in case of an opposite direction of movement 34.

In the mounted state, the hydrodynamically acting bearing 10, when stationary, bears at least with some of its elevations 20 against the oppositely adjoining components. This can be constituted, for instance, by parts of a gear mechanism. The bearing 10 is held centrally by a shaft or axle guided through the feed-through 13. At the start of the operation, at least one of the adjoining components and, where applicable the shaft or axle, begins to rotate. To the bearing 10 is here fed a lubricant, for instance lubricating oil. The initial static friction between the bearing 10 and the adjoining components passes firstly into a mixed friction (sliding and liquid friction). With rising rotation velocity, a hydrodynamically increased pressure of the lubricant builds up along the ascending slopes 22.1 and over the adjoining elevations. This leads to a situation in which the bearing 10 also no longer bears with its elevations 20 against the adjacent components, but rather a liquid film is formed between the opposite sides 11, 12 of the bearing 10 and the respectively adjoining components. The liquid film leads to a pure liquid friction between the bearing 10 and the adjoining components, whereby a very low frictional resistance is obtained.

The hydrodynamic configuration of the increased pressure of the lubricant is heavily dependent on the configuration of the hydrodynamic structures 26. The load bearing capacity of the hydrodynamically acting bearing 10 thus essentially depends on the configuration and arrangement of the hydrodynamic structures 26 during the operation of the bearing 10. In particular the inclination of the ascending slopes 22.1 here plays a crucial role in the achieved pressure increase.

According to the invention, at least some of the elevations 20 of the hydrodynamic structures 26 of the first side 11 of the bearing 10 are arranged in the region between two depressions 21 of the hydrodynamic structures 26 of the second side 12 of the bearing 10. Hence the thickness of the hydrodynamically acting bearing 10 varies in the peripheral direction. In addition, in the illustrative embodiment shown in FIG. 1, the elevations 20 arranged on the two sides 11, 12 of the bearing 10 are arranged precisely opposite one another. A pressure acting axially on the hydrodynamically acting bearing 10 thus leads to a deformation of the bearing 10 which is based solely on the elasticity of the material used. The geometry-based elastic spring action is not utilized in this case. Hence that bearing 10 according to the invention that is shown in FIG. 1 differs significantly from known hydrodynamically acting bearings 10 which have a constant material thickness in the peripheral direction, whereby the elevations 20 of one side 11, 12 are arranged respectively opposite to a depression 21 of the other side 11, 12 of the bearing 10. In such a known configuration of the bearing 10, this can be fully compressed during use, whereby its hydrodynamic properties are lost. This applies, in particular, because in the peripheral direction the opposing elevations 20 have a large distance apart, whereby between them is produced a long lever, which, in case of an axially acting pressure, leads to a bending, directed counter to the inclination of the slopes 22, of the hydrodynamically acting bearing. In design terms, in known bearings of this kind, given a limitedly possible material selection and specified axial spatial relationships, only the distance between the elevations 20 and the adjacent depressions 21 in the peripheral direction can be altered in order to achieve increased stability against axially acting forces. The effect of the hydrodynamically acting structures 26 is also, however, influenced thereby. In contrast, in that hydrodynamically acting bearing 10 according to the invention that is shown in FIG. 1, the position of the elevations 20 and of the depressions 21, as well as the inclination of the slopes 22, 22.1, 22.2, can be freely chosen. These are maintained even under high pressures acting axially on the bearing 10. As a result, the bearing 10 can be exactly adapted to the respective requirements and the present installation situation.

FIG. 2 shows in a perspective side view the hydrodynamically acting bearing 10 in the form of a thrust washer having elevations 20 arranged in offset relationship. Same component and regions of the bearing 20 are here denoted as adopted for FIG. 1.

Contrary to that design variant of the hydrodynamically acting bearing 10 that is shown in FIG. 1, in the present case the elevations 20 of the first side 11 are arranged angularly offset from the elevations 20 of the second side 12 of the bearing 10. Hence, in the peripheral direction, a lever arm 33 is respectively formed between an elevation 20 of the first side 11 and the closest elevation 20 of the opposite second side 12 of the hydrodynamically acting bearing 10. The lever arm 33 is represented by a double arrow arranged between the two markings 30, 31 marking the location of the elevations 20, and alters along the radius of the bearing 10. In accordance with the elevations 20, the depressions 21, and hence the slopes 22, of the opposite sides 11, 12 of the bearing 10 are also arranged angularly offset from one another.

Given a pressure which during operation acts axially on the hydrodynamically acting bearing 10, the bearing 10 is deformed to such effect that the distance, measured in the axial direction, between the elevations 20 arranged on the opposite sides 11, 12 diminishes. As a result, the inclination of the slopes 22, 22.1, 22.2 also diminishes. The extent to which the bearing 10 deforms under an acting pressure depends, apart from on the mechanical properties and the thickness of the material of the bearing 10, essentially on the distance, measured in the peripheral direction, between the adjacent elevations 20 arranged on the opposite sides 11, 12 of the bearing 10, and hence on the length of the formed lever arm 33. A long lever arm 33 leads to a comparatively major alteration of the inclination of the slopes 22, 22.1, 22.2, while a short lever arm 33 leads to a comparatively minor alteration of the inclination of the slopes 22, 22.1, 22.2. A less inclined slope 22, 22.1, 22.2 leads to an increased hydrodynamically formed pressure, and hence to an increased load bearing capacity of the bearing 10. As a result of the elevations 20 arranged in an angular offset relationship on the opposite sides 11, 12 of the hydrodynamically acting bearing 10, it is thus achieved that the load bearing capacity of the bearing 10 automatically adapts to the respectively obtaining axial load. By appropriate choice of the distance, measured in the peripheral direction, between elevations 20 arranged adjacently on opposite sides 11, 12 of the bearing 10, the adaptation of the load bearing capacity to changing axial loads can here be specified. Hydrodynamically acting bearings 10 produced from same material and having same total thickness can thus be provided, which bearings have a different alteration of their load bearing capacity under an acting axial load. The hydrodynamically acting bearing 10 can thereby be optimally adapted to the expected load without the need to use another material or alter the total thickness of the bearing 10.

FIG. 3 shows in a schematic side view a detail of the hydrodynamically acting bearing 10 in the form of a thrust washer having formed break contact surfaces 23. Same component and regions of the bearing 20 are here denoted as previously adopted.

The break contact surfaces 23 are arranged in the region of the elevations 20 of the hydrodynamically acting bearing 10. The break contact surfaces 23 of one side 11, 12 are respectively arranged in a common plane. The break contact surfaces 23 are here oriented plane-parallel to the center plane of the hydrodynamically acting bearing 10.

The hydrodynamically acting structures 26 of the bearing 10 are configured the same on both sides 11, 12. Hence no mounting direction is specified. The break contact surfaces 23, and hence the elevations 20, are arranged angularly offset from one another on the opposite sides 11, 12 of the bearing 10, as is described, in terms of its impact, already in connection with FIG. 2.

As a result of the break contact surfaces 23, in the stationary state an enlarged contact area between the hydrodynamically acting bearing 10 and the adjoining components is formed. This facilitates the start of the movement. During operation, the pressure rises respectively over the ascending slope 22.1 and reaches its maximum over the following break contact surface 23. As a result of the design of the ascending slopes 22.1 and the break contact surfaces 23, the share of the load bearing area in relation to the total area of one side 11, 12 of the hydrodynamically acting bearing 10 can thus be specified. As the load bearing area is here denoted that region of one side 11, 12 of the hydrodynamically acting bearing 10 over which, through the hydrodynamic effect of the hydrodynamically acting structures 26, an increase in pressure of the lubricant takes place. Preferably, the hydrodynamically acting structures 26 are designed such that an area utilization factor within the region of 0.3-0.7 is obtained. The area utilization factor is the share of the load bearing area in relation to the total area of one side 11, 12 of the hydrodynamically acting bearing 10. Particularly preferredly, the area utilization factor is round about 0.5.

The break contact surfaces 23 shown in FIG. 3 preferably form during operation of the hydrodynamically acting bearing 10. Starting from a hydrodynamically acting bearing 10 as is shown in FIG. 2 without break contact surfaces 23, the elevations 20 firstly rub against the adjoining components. To this end, the hydrodynamically acting bearing 10 is in new condition designed such that no continuous liquid friction is yet obtained. As a result of the solid friction and the therewith associated wear, the crests of the elevations 20 are abraded, whereby the break contact surfaces 23 are formed. In the region of the formed break contact surfaces 23, the hydrodynamic pressure on this area is slowly reduced to ambient pressure, whereby an additional load bearing capacity is obtained and the total load bearing capacity is boosted. If, as a result of the progressive abrasion of the elevations 20 and of the therewith associated enlargement of the break contact surfaces 23, the pressure is large enough, a continuous lubricant film is formed. From this moment, the elevations 20 of the hydrodynamically acting bearing 10 are, during operation, no longer in direct contact with the adjoining components and a pure liquid friction obtains. Accordingly, the hydrodynamically acting bearing 10 automatically beds in to such effect that, under the obtaining load, a sufficiently high, hydrodynamic pressure is built up to achieve the desired low-loss liquid friction. This is advantageous, in particular, in hydrodynamically acting bearings 10 configured as thrust washers, since, in these, the axially acting forces are not known in detail.

FIG. 4 shows in a top view the hydrodynamically acting bearing 10 shown in FIG. 3. The top view is here realized onto the first side 11 of the hydrodynamically acting bearing 10, which first side, however, apart from the already described angular offset, is structured in accordance with the second side 12. The hydrodynamically acting structures 26 are configured as a peripherally running periodic succession of descending slopes 22.2, depressions 21, ascending slopes 22.1, and break contact surfaces 23 forming the elevations 20. The slopes 22, 22.1, 22.2 and the break contact surfaces 23 are here respectively configured as an angular segment of the respective side 11, 12 of the hydrodynamically acting bearing 10. In the shown design variant, each of the segments covers a same sector. It is also conceivable, however, that the descending slopes 22.2 and/or the ascending slopes 22.1 and/or the break contact surfaces 23 respectively occupy different sectors.

FIG. 5 shows in a top view the hydrodynamically acting bearing 10 in the form of a thrust washer having an inner and an outer retaining edge 24, 25. The hydrodynamically acting structures 26 are configured and denoted in accordance with the illustrative embodiment shown in FIGS. 3 and 4. The inner and the outer retaining edge 24, 25 delimit the hydrodynamically acting structures 26 in the radially inward and outward directions in the region of the depressions 21 and slopes 22. A situation in which the lubricant is displaced from the region of the hydrodynamically acting structures 26 is thereby avoided. The inner retaining edge 24 and/or the outer retaining edge 25 can have contours which are defined in the peripheral direction, wherein, for the purpose of the lubricant exchange, gaps must be provided both in the inner and outer retaining edge 24 and 25. These can preferably be arranged in the region of the depressions 21 or at the start of the slopes 22, in the transition region to the depressions 21. They can in particular be configured as radially open flow regions for the lubricant.

FIG. 6 shows in a side view the hydrodynamically acting bearing 10 in the form of a thrust washer having a different number of elevations 20 and depressions 21 on the opposite sides 11, 12 of the bearing 10. In the present case, the division of the hydrodynamically acting structures 26 is chosen such that, opposite to an elevation 20 and a depression 21 of the first side 11, are respectively arranged a plurality of elevation 20 of the second side 12 of the hydrodynamically acting bearing 10. As a result of the different division of the hydrodynamically acting structures 26 arranged on the opposite sides 11, 12 of the hydrodynamically acting bearing 10, different friction and load bearing behavior can be assigned to each of the sides 11, 12. Due to this characteristic, such a variant according to the invention can be operated at very high rotation velocities. The component can co-rotate in similar manner to the operating behavior of a floating bush mounting, based on the different friction behavior of the opposite sides, and the velocity gradient from thrust collar to the housing can decline in stages. It is hence achieved that, on the side which lies opposite the rotating thrust collar, the hydrodynamic velocity is increased and the relative velocity reduced. Hence on this side an increase in load bearing capacity is obtained, combined with a simultaneous reduction in friction. The total load bearing capacity and friction is then obtained from the sum of both sides 11, 12. Via the different number of hydrodynamic structures, this behavior can be adapted. Likewise, it is conceivable to provide on the opposite sides 11, 12 of the hydrodynamically acting bearing 10 different hydrodynamically acting structures 26 in order to enable adaptation to the respectively adjoining components. In this way, for instance, on the first side a wave structure, and on the opposite, second side a hydrodynamically acting structure, such as a retaining edge or a wedge surface geometry, can be provided.

FIG. 7 shows in a perspective side view a hydrodynamically acting bearing 10 in the form of a thrust washer having a different number of elevations 20 and depressions 21 and having an offset of the elevations 20 on the opposite sides 11, of the bearing 10. The shown hydrodynamically acting bearing 10 thus has on its second side 12 *a*, relative to the first side 11, different division of the hydrodynamically acting structures 26, as this has already been described in connection with the illustrative embodiment shown in FIG. 6. In contrast to the illustrative embodiment shown in FIG. 6, in the design variant shown in FIG. 7 the elevations 20 of the second side 11 are arranged angularly offset from the adjacent elevations 20 on the first side 12. As a result, the lever arm 33 is formed between the adjacent elevations 20 of the opposite sides 11, 12 of the hydrodynamically acting bearing 10. As already described in connection with FIG. 2, the lever arm 33 is here oriented in the peripheral direction of the bearing 10. Those elevations 20 of the second side 12 which are further distanced from the elevations 20 of the first side 11 are correspondingly arranged angularly offset from the depressions 21 of the first side 11.

Given a pressure which acts axially on the hydrodynamically acting bearing 10, around the formed lever arms 33 a torque is respectively transmitted to the hydrodynamically acting bearing 10. The hydrodynamically acting bearing 10 is consequently deformed, whereby the incline of the slopes 22, 22.1, 22.2 alters. As a result of such a deformation, in particular the inclination of the ascending slopes 22.1 diminishes. As already previously described, a reduced inclination of this kind leads to the build-up of a greater hydrodynamic pressure, whereby the load bearing capacity of the hydrodynamically acting bearing 10 increases. FIG. 7 thus shows a hydrodynamically acting bearing 10, the load bearing capacity of which on each side 11, 12 can be individually adjusted to the respectively adjoining component, whereupon the load bearing capacity is automatically readjusted in dependence on the respectively obtaining axial load.

FIG. 8 shows in a perspective side view a hydrodynamically acting bearing 10 in the form of a thrust washer having a different number of elevations 20 and depressions 21 and having a, in comparison to the illustrative embodiment shown in FIG. 7, maximal offset of the elevations 20 on the opposite sides 11, 12 of the bearing 10. Over and above this offset, periodically recurring deformation characteristics are obtained. As a result, lower axial forces are necessary to produce an appropriate deformation, and hence an increase in load bearing capacity, of the hydrodynamically acting bearing 10. By adapting the offset of the hydrodynamically acting structures 26 between the two sides 11, 12 of the hydrodynamically acting bearing 10, and hence the length of the formed lever arm 33, the capability of the bearing 10 to adapt its load bearing capacity in dependence on a pressure acting axially on the bearing 10 can thus be influenced. This is in particular advantageous when, due to the further demand on the bearing 10, only a limited selection of materials having similar mechanical properties is available for the production of the bearing 10, or when the total thickness of the bearing 10 can be altered only to a limited extent, so that, for instance, a desired stiffening of the bearing 10 cannot be achieved by using another material or using a greater material thickness of the bearing 10.

FIG. 9 shows in a top view a hydrodynamically acting bearing 10 in the form of a thrust washer having curvedly running depressions 21. Similarly to the hydrodynamically acting bearing 10 shown in FIGS. 3 and 4, in the illustrative embodiment shown in FIG. 9 the hydrodynamically acting structures 26 are formed by a periodic and segmental succession of descending slopes 22.2, depressions 21, ascending slopes 22.1 and break contact surfaces 23 forming the elevations 20. The depressions 21 and the transitions between the slopes 22 and the break contact surfaces 23 are of curved configuration. The inner sides of the curves are here, in the present case, oriented in the direction of movement 34. The direction of movement 34 here again constitutes the relative movement of the hydrodynamically acting bearing 10 in relation to the surface of a component arranged adjacent to the first side 11 of the bearing 10. It is also conceivable that also the slopes 22 are realized such that they are concavely shaped in accordance with the curvature. As a result of the curvature, a direction of conveyance is formed for the used lubricant. As in the shown illustrative embodiment, this direction of conveyance can be directed inward from the outer rim of the hydrodynamically acting bearing 10. It is also conceivable, however, by appropriate configuration of the curvature, to form a direction of conveyance which is directed from inside to out. As a result of the curvature, the lubricant us thus purposefully sucked in between the hydrodynamically acting bearing 10 and an adjoining component. It is hence ensured that a sufficient quantity of lubricant is always present between the hydrodynamically acting bearing 10 and the adjoining component.

FIG. 10 shows in a top view of the first side 11 a hydrodynamically acting bearing 10 in the form of a thrust washer, having hydrodynamic structures 26 which vary in terms of their contour. The hydrodynamically acting structures respectively have a curvedly running depression 21. Between the depressions 21 and the elevations 20 is respectively configured an ascending slope 22.2. This has, toward the adjoining elevation 20, a likewise curved transition. The ascending slopes 22.1 inclined in the direction of movement 34 have transitions to the adjacent elevations 20, which transitions run in some regions in a straight line and in some regions in the shape of a wedge. Along the radius of the hydrodynamically acting bearing 10, The ascending slopes 22.1 thus alter, both their length and their inclination. The length is here respectively measured in the peripheral direction between a depression 21 and the transition to the adjoining elevation 20. The depth of the depressions 21 in relation to the elevations 20 varies with increasing distance from the axle of the hydrodynamically acting bearing 10. In the present case, the depth of the depressions 21 decreases with increasing radius. The depressions 21 thus pass, toward the rim of the hydrodynamically acting bearing 10, into an outer retaining edge 25, which is arranged in the same plane as the elevations 20.

The three-dimensional topography of the hydrodynamically acting structures 26 is configured such that it forms a contour which is constant or else varies in the radial direction, narrows in the shape of a wedge and is reopened. This contour is bounded by an outer retaining edge 25 which runs in the peripheral direction. Through the different configuration of the length and inclination of the ascending slopes 22.1 in dependence on the distance to the rotational axis of the hydrodynamically acting bearing 10, the built-up, hydrodynamic pressure alters in dependence on the radius. The load bearing capacity of the hydrodynamically acting bearing 10 can in this way be differently adjusted for different radii. The load bearing capacity can hence be exactly adapted to the respectively expected loads. The depressions are open toward the feed-through 13 of the hydrodynamically acting bearing 10. Through the openings, lubricant can be conducted into the hydrodynamically acting structures 26. It is conceivable to provide, on the opposite second side 12 of the hydrodynamically acting bearing, similar hydrodynamically acting structures 26. These can be oriented in the same direction as the hydrodynamically acting structures 26 of the first side 11, or else in mirror image thereto. Preferably, the hydrodynamically acting structures 26 of the two sides 11, 12 have a defined association to one another.

FIG. 11 shows in a top view a hydrodynamically acting bearing 10 in the form of a thrust washer having segments produced from different materials 40, 41. Each segment is here formed throughout of one of the materials 40, 41. At the boundary surfaces, the two materials 40, 41 are respectively fixedly connected to one another, in particular by form closure or force closure.

The two materials 40, 41 have different thermal expansion coefficients. In this way, in the present case the first material 40, upon an increase in temperature, expands less than the second material 41. The hydrodynamically acting bearing 10 is produced such that the two materials 40, 41 on both sides 11, 12 terminate at room temperature in a same plane. If the hydrodynamically acting bearing 10 warms up during operation, then in the region of the more strongly expanding second material 41 elevations 20, and in the region of the lesser expanding first material 40 depressions 21 are formed. Owing to the fixed connection of the two materials 40, 41 at the respective boundary surfaces, in the transition regions of the materials 40, 41 are formed slopes 22. The elevations 20, the depressions 21 and the slopes 22 constitute hydrodynamically acting structures 26. With rising temperature, these become increasingly prominent.

FIG. 12 shows in a perspective side view a hydrodynamically acting bearing 10 in the form of a thrust washer having different materials 40, 41.

The hydrodynamically acting bearing 10 is produced from a material pairing consisting of a first material 40 and material inlays consisting of a second material 41. The first material 40 here has a lesser thermal expansion than the second material 41. The material inlays are injected by means of 2K technology into the first material 40, or the second material 41 is overmolded by the first material 40. It is also conceivable that the material inlays made of the second material 41 are plugged into corresponding receptacles of the first material 40. At room temperature, the opposite sides 11, 12 of the hydrodynamically acting bearing 10 are realized flat. When warmed during operation of the bearing 10, the material inlays consisting of the second material 41 expand more strongly than the surrounding first material 40. As a result, elevations 20 are formed in the region of the material inlays, depressions 21 in the region of the first material 40, and slopes 22 therebetween. The hydrodynamically acting structures 26 are thus formed once the hydrodynamically acting bearing 10 is thoroughly warmed. The elevations 20 configured on the two sides 11, 12 of the bearing 20, and the depressions 21, respectively lie opposite one another without angular offset.

It is also conceivable that the two materials 40, 41 differ in terms of their modulus of elasticity. During operation, the material 40, 41 having the lesser modulus of elasticity is then more strongly deformed by the axial pressure acting on the bearing 10 than is the material 40, 41 having the lower modulus of elasticity. If, for instance, the material inlays have a greater modulus of elasticity than the surrounding first material 40, then the region of the first material 40 is more strongly deformed than the region in which the material inlays are arranged. Hence in the region of the first material 40 depressions 21 are formed, and in the region of the material inlays consisting of the second material 41 elevations 20 having intervening slopes 22, whereby the hydrodynamically acting structures 26 are formed.

It is likewise conceivable, instead of the material inlays consisting of the second material 41, to provide recesses in the first material 40. By utilizing the elasticity of the first material 40, given a pressure which acts axially on the bearing 10, depressions 21 are formed in the region of the recesses, while, in the adjoining regions formed throughout of the first material 40, elevations are formed.

Advantageously, in the shown design variants consisting of two materials 40, 41 of different thermal expansion or different elasticity, or in the shown combination of a continuous material with introduced recesses, the hydrodynamically acting structures are formed automatically during operation of the hydrodynamically acting bearing 10. At rest, the two sides 11, 12 of the bearing 10 are of flat construction. A smooth start-up of the bearing 10 is thereby obtained. It is likewise conceivable to construct hydrodynamic bearings 10 such that, already without temperature increase or external axial pressure, hydrodynamically acting structures 26 are formed. These are then accentuated during operation of the hydrodynamically acting bearing 10.

It is conceivable, using two materials 40, 41 having different thermal expansion, to provide appropriately prominent hydrodynamically acting structures 26 already at room temperature. These can be produced by primary shaping, material removal or by means of embossing. For instance, in the region of the material inlays consisting of the second material, depressions 21 are formed, and in the region, formed of the first material 40, between the material inlays, elevations 20 are formed. The slopes 22 are then arranged between the depressions 21 and the elevations 20. If, in this design variant, the second material 41 has a greater thermal expansion than the first material 40, then as the temperature of the hydrodynamically acting bearing 10 rises during use, the depth of the depressions 21 in relation to the elevations 20 diminishes. As a result, the inclination of the slopes 22 also diminishes. Lesser inclined slopes 22 have a stronger hydrodynamic effect. As a result, the formed pressure of the lubricant in the region of the ascending slope 22.1 and of the following elevation 20 rises. As a result of the increased temperature, the viscosity of the used lubricant simultaneously falls. At a lower viscosity of the lubricant, a lower hydrodynamically developed pressure sets in. This is compensated by the less inclined slopes 22. There is thus acquired a self-adjusting hydrodynamically acting bearing 10, which, both in the cold and in the warm state, has a good and broadly equal load bearing capacity.

FIG. 13 shows in a perspective side view a hydrodynamically acting bearing 10 in the form of a thrust washer having material inlays consisting of a different material 40, 41, in a further embodiment. The material inlays consisting of the second material 41 have a lesser thermal expansion or a lower modulus of elasticity than the first material 40. Hence, during operation according to the previously described mechanisms, elevations are formed in the regions of the first material 40 20, and depressions in the region of the second material 41. Given various radii of the bearing 10, the material inlays are guided in the peripheral direction differently far into the surrounding regions consisting of the first material 40. As a result, the orientation and inclination of the slopes 22, and hence the load bearing capacity of the bearing 10, are influenced in dependence on the radius. The load bearing capacity of the bearing 10 can in this way be optimally adapted to the respective requirements.

FIG. 14 shows the hydrodynamically acting bearing 10 shown in FIG. 13, with additional lubricant grooves 27. The lubricant grooves 27 run radially from the feed-through 13 to the outer rim of the hydrodynamically acting bearing 10. They are arranged in the region of the material inlays consisting of the second material 41, and hence, in accordance with the description to FIG. 13, in the region of the depressions 21 formed during operation. Through the lubricant grooves 27, lubricant can be fed to the hydrodynamically acting structures 26.

FIG. 15 shows in a perspective side view a hydrodynamically acting bearing 10, designed for one rotational direction, in the form of a thrust washer. Likewise, material inlays consisting of a first material 40 are here embedded into a matrix of a second material 41. In the present case, the materials 40, 41 differ in terms of their thermal expansion coefficients, so that, at operating temperature, the hydrodynamically active structures 26 are formed. The contours of the material inlays are realized such that they are not mirror-symmetrical in the peripheral direction. A differing geometry of the formed ascending and descending slopes 22.1, 22.2 is thereby obtained. Accordingly, the thus configured, hydrodynamically acting bearing 10 is accordingly optimized for one rotational direction, which must be appropriately heeded during the mounting of the bearing 10.

FIG. 16 shows in a perspective side view a hydrodynamically acting bearing 10 in the form of a thrust washer having a three-dimensional embossment. Starting from the inner feed-through 13 of the hydrodynamically acting bearing 10, the depressions 21 firstly widen in the peripheral direction and narrow again toward the outer rim of the bearing 10. The slopes 22 arranged on both sides of the depressions 21 follow this contour. Starting from the depressions 21, the inclination of the slopes 22 diminishes up to their transition into the adjoining elevations 20. The depressions 21 have for the feed-through 13 an inner lubricant opening 28.1 and, opposite, an outer lubricant opening 28.2.

By the widened region of the depressions 21, a wide channel cross section is respectively formed. The depressions 21 can here have a comparatively shallow depth, preferably of around 5-50 µm, in relation to the elevations 20. This depth proves advantageous, in particular in all inventive embodiments of hydrodynamic bearings which have a size smaller than 150 mm external diameter. As a result of the shallow depth and the, at the same time, wide channel cross section, a large-scale conveyance of the lubricants into the region of the hydrodynamically acting structures 26 is achieved by means of capillary action. Preferably, the inner lubricant opening 28.1 and the outer lubricant opening 28.2 have different cross sections. It can thereby be achieved that the pressure of the lubricant is greater in the region of the inner lubricant opening 28.1 than in the region of the outer lubricant opening 28.2. This creates a pumping effect, with the aid of which the lubricant can be continuously exchanged. This is advantageous, in particular, in applications which lead to high temperatures of the lubricant, since this is protected from thermally induced decomposition.

For the purpose of optimizing or maximizing the load bearing strength of the hydrodynamically acting bearing according to the invention, the following dimensioning specifications have proved advantageous:

The pocket length (length of a depression (21)) in the peripheral direction of the bearing should be chosen as follows: pocket length equals (0.6 to 0.9)×L. segment. A pocket geometry is here always viewed in isolation. For example, in the case of four pockets and one rotational direction, ¼ of the periphery is then viewed as the L. segment, in a bearing for both rotational directions then ⅛ is viewed as the segment (see FIGS. 13 to 16).

The pocket width (width of a depression (21)) in the radial direction of the bearing should be chosen as follows: pocket width equals (0.4 to 0.8)×bearing width. The bearing width is here the diameter differential between the external diameter of the hydrodynamic bearing and the internal diameter, formed with the feed-through 13, of the hydrodynamic bearing.

The pocket depth (retaining edge depth or wedge depth–maximal extent of the depression (21) in the direction of the bearing axis): T equals $(0.6$ to $2) \times h_{min.[admiss.]}$. Correspondingly, the pocket (depression 21) should be 0.6 to 2-times deeper than the admissible minimal lubrication gap height. This is determined by the roughness and production accuracies of the sliding partners and will vary for different dimensions.

The above-described dimensioning specifications do not have to be realized cumulatively within the scope of the invention. It is also conceivable for just one or two dimensioning specifications to be used on the bearing in order to acquire a good load bearing capacity.

The invention claimed is:

1. A hydrodynamically acting bearing, comprising:
   a disk shaped bearing having opposite first and second sides, each side including a plurality of hydrodynamic structures extending in a peripheral direction, the structures including elevations, depressions arranged between adjacent elevations, and slopes running from the depressions to the elevations;
   wherein:
   at least one of the elevations of the first side is arranged in the peripheral direction between two adjacent depressions of the second side;
   the elevations of the first side are arranged offset from one another in the peripheral direction;
   the bearing includes a center plane;
   a distance to a surface of the elevations from the center plane measured normal to the center plane is constant for all radii from a center axis of the bearing; and a distance to a surface of the depressions from the center plane measured normal to the center plane alters with increasing radius from the center axis of the bearing such that a distance measured normal to the center plane between a depression and an adjoining elevation diminishes with increasing radius from the center axis of the bearing.

2. The bearing of claim 1, wherein:
the hydrodynamic structures of at least one of the first and second sides are configured such that the hydrodynamic structures repeat periodically.

3. The bearing of claim 1, wherein:
the elevations of the first side of the bearing are arranged angularly offset in the peripheral direction from the depressions of the second side of the bearing.

4. The bearing of claim 1, wherein:
the first side of the bearing has a different number of elevations than does the second side of the bearing.

5. The bearing of claim 1, wherein:
the bearing has a material thickness between the first and second sides, the material thickness varying in the peripheral direction or in a radial direction or in both the peripheral direction and the radial direction.

6. The bearing of claim 1, wherein:
at least some of the elevations each include a break contact surface running in the peripheral direction.

7. The bearing of claim 1, wherein:
on at least one of the first and second sides the depressions and the slopes are bounded radially on at least one of a radially inside and a radially outside by a retaining edge.

8. The bearing of claim 1, wherein:
the elevations and the depressions run from a radially inner region of the bearing to a radially outer region of the bearing in straight lines or on curved paths.

9. The bearing of claim 1, wherein:
at least some of the elevations each include a break contact surface running in the peripheral direction; and
in the peripheral direction a sector overlaid by each break contact surface remains constant for all radii of the bearing.

10. The bearing of claim 1, wherein:
at least some of the elevations each include a break contact surface running in the peripheral direction; and
in the peripheral direction a sector overlaid by each break contact surface varies with increasing distance from a center axis of the bearing.

11. The bearing of claim 1, wherein:
the hydrodynamic structures are formed by at least one of primary shaping or material removing or embossing machining.

12. The bearing of claim 1, wherein:
the bearing is formed of at least two materials having different thermal expansion coefficients, and the hydrodynamic structures are formed by different volume expansions of the at least two materials at a prevailing operating temperature.

13. The bearing of claim 12, wherein:
the at least two materials bear one against the other at boundary surfaces, and at the boundary surfaces the at least two materials are connected to each other at least in some regions by integral bonding or by force closure.

14. The bearing of claim 12, wherein:
at least one of the two materials is a polymer material.

15. The bearing of claim 1, wherein:
the first side of the bearing includes a hydrodynamically active area in a range of from 30% to 70% of a total area of the first side of the bearing.

16. A hydrodynamically acting bearing, comprising:
a disk shaped bearing having opposite first and second sides, each side including a plurality of hydrodynamic structures extending in a peripheral direction, the structures including elevations, depressions arranged between adjacent elevations, and slopes running from the depressions to the elevations;
wherein:
at least one of the elevations of the first side is arranged in the peripheral direction between two adjacent depressions of the second side;
the elevations of the first side are arranged offset from one another in the peripheral direction;
the bearing is formed of at least two materials having different thermal expansion coefficients, and the hydrodynamic structures are formed by different volume expansions of the at least two materials at a prevailing operating temperature;
at least one of the two materials is a polymer material;
at least some of the elevations each include a break contact surface running in the peripheral direction;
the break contact surfaces are formed of metal; and
the slopes and depressions are formed of the polymer material.

17. A hydrodynamically acting bearing, comprising:
a disk shaped bearing having opposite first and second sides, each side including a plurality of hydrodynamic structures extending in a peripheral direction, the structures including elevations, depressions arranged between adjacent elevations, and slopes running from the depressions to the elevations;
wherein:
at least one of the elevations of the first side is arranged in the peripheral direction between two adjacent depressions of the second side;
the elevations of the first side are arranged offset from one another in the peripheral direction;
the bearing is formed of at least two materials having different thermal expansion coefficients, and the hydrodynamic structures are formed by different volume expansions of the at least two materials at a prevailing operating temperature;
each of the first side and the second side of the bearing are formed in the peripheral direction by a periodic succession of segments of the at least two materials; and
the periodic succession of the segments of the first side is angularly offset in relation to the periodic succession of the segments of the second side.

18. A hydrodynamically acting bearing, comprising:
a disk shaped bearing having opposite first and second sides, each side including a plurality of hydrodynamic structures extending in a peripheral direction, the structures including elevations, depressions arranged between adjacent elevations, and slopes running from the depressions to the elevations;
wherein:
at least one of the elevations of the first side is arranged in the peripheral direction between two adjacent depressions of the second side;
the elevations of the first side are arranged offset from one another in the peripheral direction;
the bearing is formed of at least two materials having different thermal expansion coefficients, and the hydrodynamic structures are formed by different volume expansions of the at least two materials at a prevailing operating temperature; and at least some of the depressions and slopes are formed of a material having a comparatively higher thermal expansion coefficient than a material of adjacent elevations.

19. A hydrodynamically acting bearing, comprising:

a disk shaped bearing having opposite first and second sides, each side including a plurality of hydrodynamic structures extending in a peripheral direction, the structures including elevations, depressions arranged between adjacent elevations, and slopes running from the depressions to the elevations;

wherein:

at least one of the elevations of the first side is arranged in the peripheral direction between two adjacent depressions of the second side;

the elevations of the first side are arranged offset from one another in the peripheral direction;

the first side of the bearing includes a hydrodynamically active area greater than 50% of a total area of the first side of the bearing; and the second side of the bearing includes a hydrodynamically active area less than 50% of a total area of the second side of the bearing.

* * * * *